UNITED STATES PATENT OFFICE.

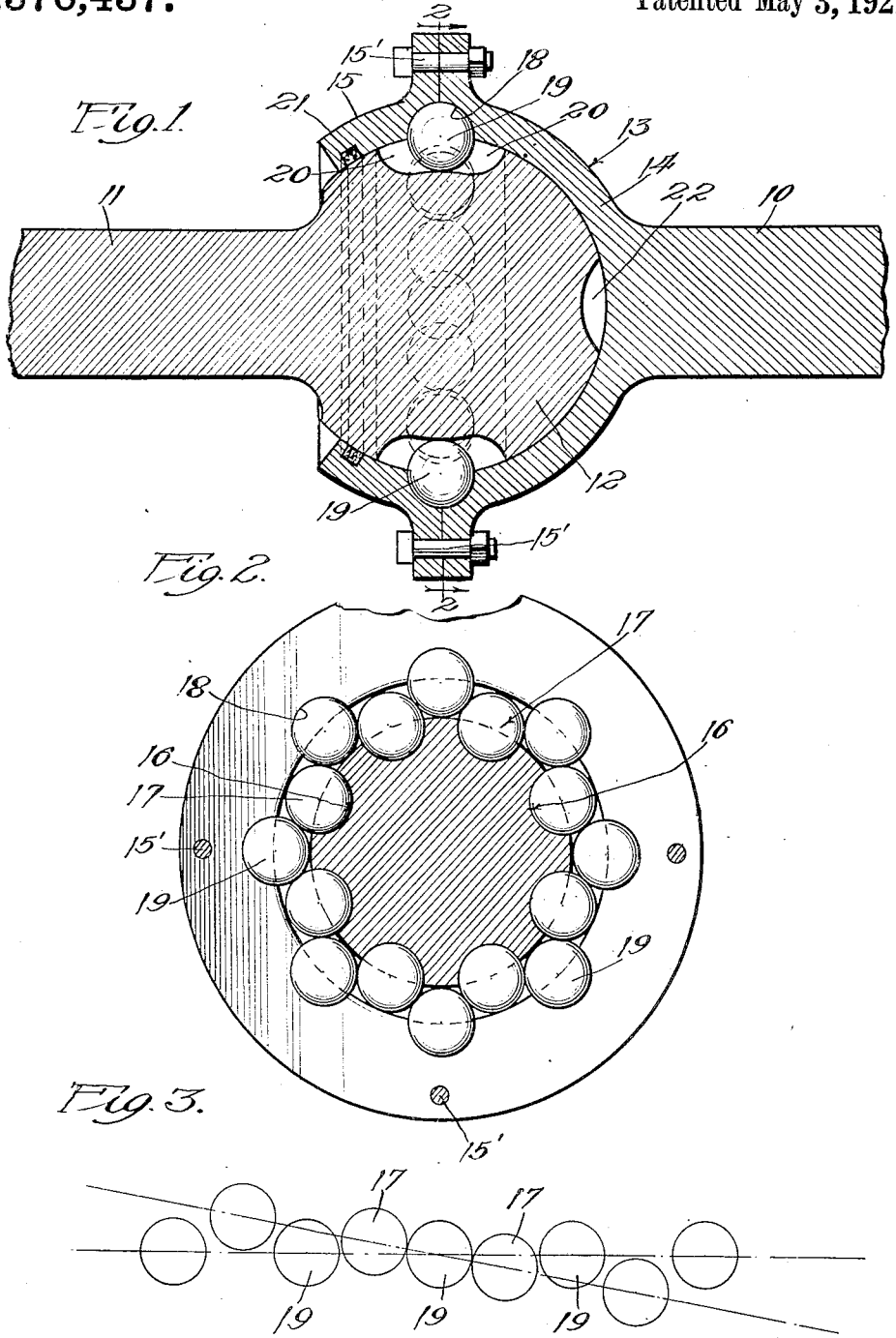

HARRISON H. HOOD, OF CHICAGO, ILLINOIS.

UNIVERSAL JOINT.

1,376,437.  Specification of Letters Patent.  Patented May 3, 1921.

Application filed August 22, 1919. Serial No. 319,049.

*To all whom it may concern:*

Be it known that I, HARRISON H. HOOD, a citizen of the United States, and a resident of Chicago, in the county of Cook and State of Illinois, have invented certain new and useful Improvements in Universal Joints; and I do hereby declare that the following is a full, clear, and exact description thereof, reference being had to the accompanying drawings, and to the characters of reference marked thereon, which form a part of this specification.

This invention relates to improvements in universal joints for connecting sections of rotating shafts that are disposed at an angle to each other.

Among the objects of the invention is to provide an extremely rugged and compact universal joint which is made of few simple parts and which may be readily assembled and taken apart.

Another object of the invention is to provide a universal joint in which the driving connection between the shaft sections is effected through a pair of circular series of anti-friction elements or balls, thereby avoiding wear incident to the driving connections of prior universal joints.

Another object of the invention is to provide a joint of this general character in which the elements of the joint may be embodied in a retained lubricating medium, whereby the movable elements of the joint are properly lubricated and access of dust to the interior of the joint avoided.

Other objects of the invention are to improve and simplify universal joints, and the invention consists in the combination and arrangement of the parts shown in the drawings and described in the specification, and is pointed out in the appended claims.

In the drawings;

Figure 1 is an axial section of a universal joint embodying my invention.

Fig. 2 is a transverse section on the line 2—2 of Fig. 1.

Fig. 3 is a diagrammatic view illustrating the relation of the anti-friction driving elements of the joint when the shaft sections are inclined relatively to each other.

As shown in the drawings, 10 designates one of the shaft sections and 11 the other shaft section, which are connected by a universal joint embodying my invention.

12 designates a generally spherical head which is attached to or made integral with one of the shaft sections, the section 11 as herein shown, and 13 designates a housing which partially incloses the head 12 and is attached to or made integral with the other shaft section. Said housing, as herein shown, comprises two members, to-wit, a part-spherical member 14 that is connected to or made integral with the shaft section 10 and which comprises such portion of a sphere that permits it to be placed directly over the head 12, and a removable member 15 which extends beyond the plane of the center of the head and overlaps the head beyond said plane. Said housing member 15 is shown as detachably connected to the main portion of the housing by bolts 15' extending through overlapping flanges of said members but may be otherwise connected.

The said spherical head 12 is provided with a plurality of outwardly opening, spherical seats 16 arranged as a circular series in a plane transverse to the axis of the associated shaft section 11, to receive a circular series of roller elements or balls 17. As herein shown the said seats 16 are hemispherical so that the axes of said balls are intersected by a circle describing the circumference of that portion of the head 12 which is in the plane of the seats 16. The said ball seats 16 may be located in a circular groove of the head for a purpose hereinafter described, the bottom of said groove coinciding with the axes of the balls 17 and the peripheries of said balls coinciding with a circle which describes the full circumference of said head 12.

The housing 13 is provided with a circular series of inwardly opening hemispherical seats 18 which is in the plane of the seats 16 at a time when the shaft sections 10 and 11 are alined and in which are seated balls 19 arranged as a circular series and whose axes are intersected by a circle which describes the inner cylindric face of the housing at said recesses.

The circular series of balls 17 are, therefore, located with their axes radially inside the axes of the balls 19, and the balls of one series are out of line or staggered with respect to the balls of the other series, as most clearly shown in Fig. 2. The balls of said series, thus radially spaced, and staggered, are of such diameters and their seats are so relatively disposed that the balls of one series make contact with the balls of the other series throughout when the shaft sections are alined, as shown in Fig. 1, so that the driving connection from one shaft to the other through said series of balls is effected through contact of each of the balls of one series with neighboring balls of the other series. When one of the shaft sections is deflected out of line with the other shaft section, the driving connection between the shaft sections is effected through oppositely located balls 19 of the outer series and adjacent balls of the inner series, as indicated in Fig. 3, the angular displacement of the shafts causing the other balls to be displaced from and out of driving contact with each other. In such event three active or driving balls of the outer and inner series are disposed on opposite sides of a plane passed through the axis of the shaft section 11 in a direction transverse to the angle of deflection of the shaft section, and this relation of the balls obtains regardless of the direction of deflection of the shaft sections relatively to each other.

In order that the non-active balls of the inner and outer series may thus be displaced when one of the shaft sections is deflected out of line with the other, one of said joint members, the spherical head 12 as herein shown, is formed at the sides of the series of ball receiving seats with lateral clearance spaces 20, to permit the inactive balls to laterally shift relatively to each other when the shaft sections are deflected out of relative alinement, as indicated in Fig. 3. The lateral clearance spaces may form parts of the continuous, annular groove referred to, which is in the plane of said inner ball seats 16, as indicated in Fig. 1, or each pair of lateral clearance recesses 21 may be individual to each ball 17, wherein a continuous circumferential groove does not exist.

To retain a lubricant within the joint, the removable member 15 of the housing is provided near its edge with a groove to receive a compressible packing ring 21 of felt or like material which bears on the spherical surface of the head. Said packing ring serves, not only to retain a lubricating medium within the housing, but also serves to prevent access of dust or water to the interior of the housing. The series of balls will preferably be embedded in a hard lubricating medium and, if desired, a lubricating chamber 22 may be formed in the spherical head to receive a supply of lubricant to be applied to the spherical contacting faces of the head and housing. The elements 12 and 13, the latter including the two members 14 and 15, constitute the overlapping or telescoping members of the joint which have spherical contact at both sides of the planes of the power transmitting roller elements 17 and 19 so as to maintain the active elements of the joint in relative operative position in all positions of rotative angularity of the shaft sections.

It will be noted from the foregoing that the driving connection between the two shaft sections is effected solely through relatively movable anti-friction elements or balls which reduces friction between said connections in a relative change of axes of the shaft sections to a minimum, in that the contact between the driving parts is always a rolling contact. Furthermore, this construction results in transmitting the driving connection through the full diameters of the balls whereby said driving connection is strong and rugged, and which also enables the parts to be made small relatively to the power transmitted from one side of the joint to the other. It will be furthermore observed that the construction employs but few parts which may be economically constructed, and that the construction is such as to render the assembling of the joint very simple.

I claim as my invention:

1. A universal joint comprising overlapping members adapted for relative flexion and radially inner and outer series of rolling, driving elements seated in said members for contact with each other.

2. A universal joint set forth in claim 1 wherein the opposing members are formed with seats in the plane of the two series of driving elements when the joint is not flexed to receive said balls.

3. A universal joint set forth in claim 1, wherein the driving elements are two series of balls seated in the opposing faces of said members with their axes radially spaced and with the balls of one series occupying different radial planes to and in contact with the balls of the other series.

4. A universal joint set forth in claim 3 and characterized further in that one of said members is provided at the sides of its ball seats with lateral clearance recesses.

5. A universal joint comprising a head and a receiving housing having spherical coacting faces and radially inner and outer series of contacting balls seated in said head and housing, respectively, to constitute driving connections between said head and housing.

6. A universal joint comprising a head and a receiving housing having spherical coacting faces and radially inner and outer series of balls seated in said head and housing, respectively, the balls of one series contacting with those of the other series and having their axes disposed in radial planes different from those of the other series.

7. A universal joint comprising a head and a receiving housing and radially inner and outer series of balls seated in said head and housing, respectively, the balls of one series contacting with those of the other series and having their axes disposed in radial planes different from those of the other series, one of the joint members provided at the sides of the ball seats therein with lateral clearance spaces, for the purpose set forth.

8. A universal joint comprising a head and a receiving housing and radially inner and outer series of contacting balls seated in said head and housing, respectively, to constitute driving connections between said head and housing, said housing and head being constructed with means to receive and retain a lubricating medium.

9. A universal joint comprising a head and a receiving housing and radially inner and outer series of balls seated in said head and housing, respectively, the balls of one series contacting with those of the other series and having their axes disposed in radial planes different from those of the other series, said housing comprising a permanent and removable member having means in the plane of the axis of the head to join them, and the removable member being grooved to receive a packing ring to bear on the spherical face of the head.

In witness whereof I claim the foregoing as my invention, I hereunto append my signature this 14th day of August, 1919.

HARRISON H. HOOD.